United States Patent [19]

Scott et al.

[11] Patent Number: 4,709,366

[45] Date of Patent: Nov. 24, 1987

[54] COMPUTER ASSISTED FAULT ISOLATION IN CIRCUIT BOARD TESTING

[75] Inventors: Marshall H. Scott, Woodinville; John D. Polstra, Seattle, both of Wash.

[73] Assignee: John Fluke Mfg. Co., Inc., Everett, Wash.

[21] Appl. No.: 761,027

[22] Filed: Jul. 29, 1985

[51] Int. Cl.[4] .............................................. G01R 31/28
[52] U.S. Cl. ......................................... 371/20; 371/25; 371/26; 371/29; 324/73 R
[58] Field of Search ........................ 371/20, 23, 26, 29, 371/25, 27; 324/73 R, 73 AT

[56] References Cited

U.S. PATENT DOCUMENTS

| 4,055,801 | 10/1977 | Pike | 371/20 X |
| 4,070,565 | 1/1978 | Borelli | 371/20 |
| 4,114,093 | 9/1978 | Long | 371/20 |
| 4,192,451 | 3/1980 | Swerling | 371/20 |
| 4,216,539 | 8/1980 | Raymond | 371/20 |
| 4,228,537 | 10/1980 | Henckels | 371/20 X |
| 4,242,751 | 12/1980 | Henckels | 371/26 |
| 4,459,695 | 7/1984 | Barratt | 371/20 X |
| 4,642,561 | 2/1987 | Groves | 371/25 X |

OTHER PUBLICATIONS

W. E. Forster, "Guaranteed On-Line Diagnoses", IBM Tech. Bulletin, vol. 21, No. 11, 4/1979, pp. 4433-4437.
"Real-Time Mapping of a Memory Storage . . .", IBM Tech. Bulletin, vol. 28, No. 4, 9/1985, p. 1567.

Primary Examiner—Jerry Smith
Assistant Examiner—Robert W. Beausoliel, Jr.
Attorney, Agent, or Firm—Stephen A. Becker; Mikio Ishimaru

[57] ABSTRACT

Circuit faults in an electronic system are isolated by a programmed computer that guides a technician node-by-node on a unit under test (UUT), such as a circuit board, to the source of a failure. Stimulus pattern signals are applied to the circuit, and responses at the circuit nodes are made by a measurement probe under the hand of the technician. As each node is probed, a stimulus pattern signal tailored for testing that node is applied to the UUT. The measured response is compared to a predetermined response corresponding to an operational UUT to generate a failure accusation or recommend the next node to be probed. The computer is programmed to expedite the search for the source of the failure by displaying to the technician clues which define the circuit nodes most apt to be defective as a result of preliminary functional testing of the UUT. The computer is further programmed to have a form of "intuition" whereby the particular nodes recommended for probing are determined in part by prior testing of the same type of UUT.

15 Claims, 7 Drawing Figures

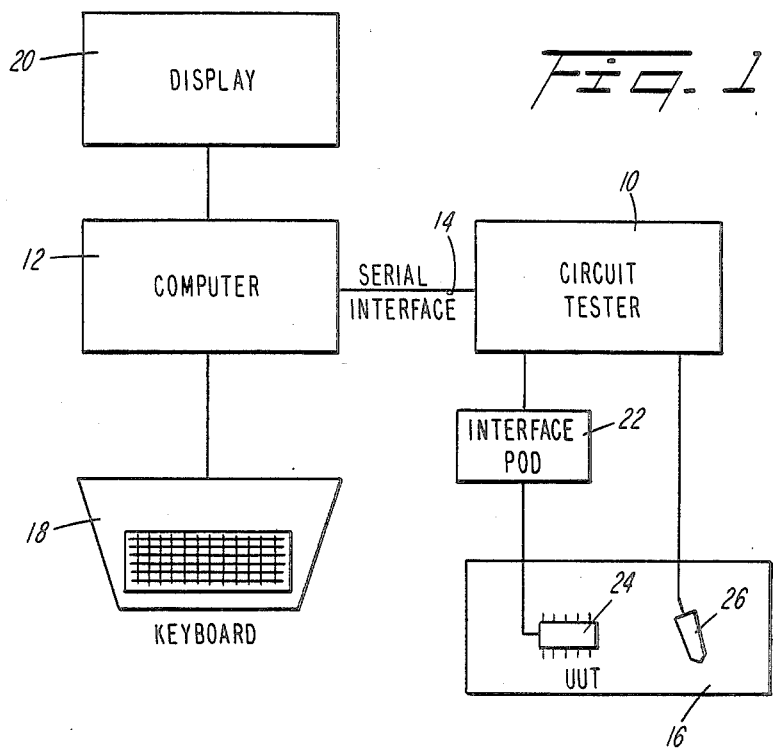
Fig. 1
| TYPE | REFERENCE | NETS | OTHER DATA |
Fig. 2
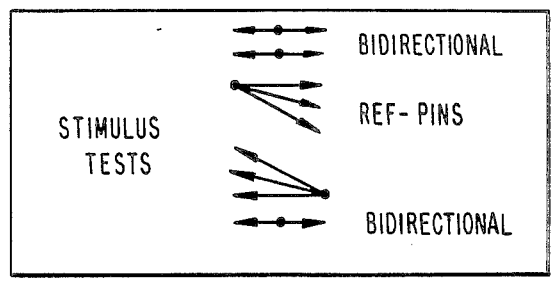
Fig. 3

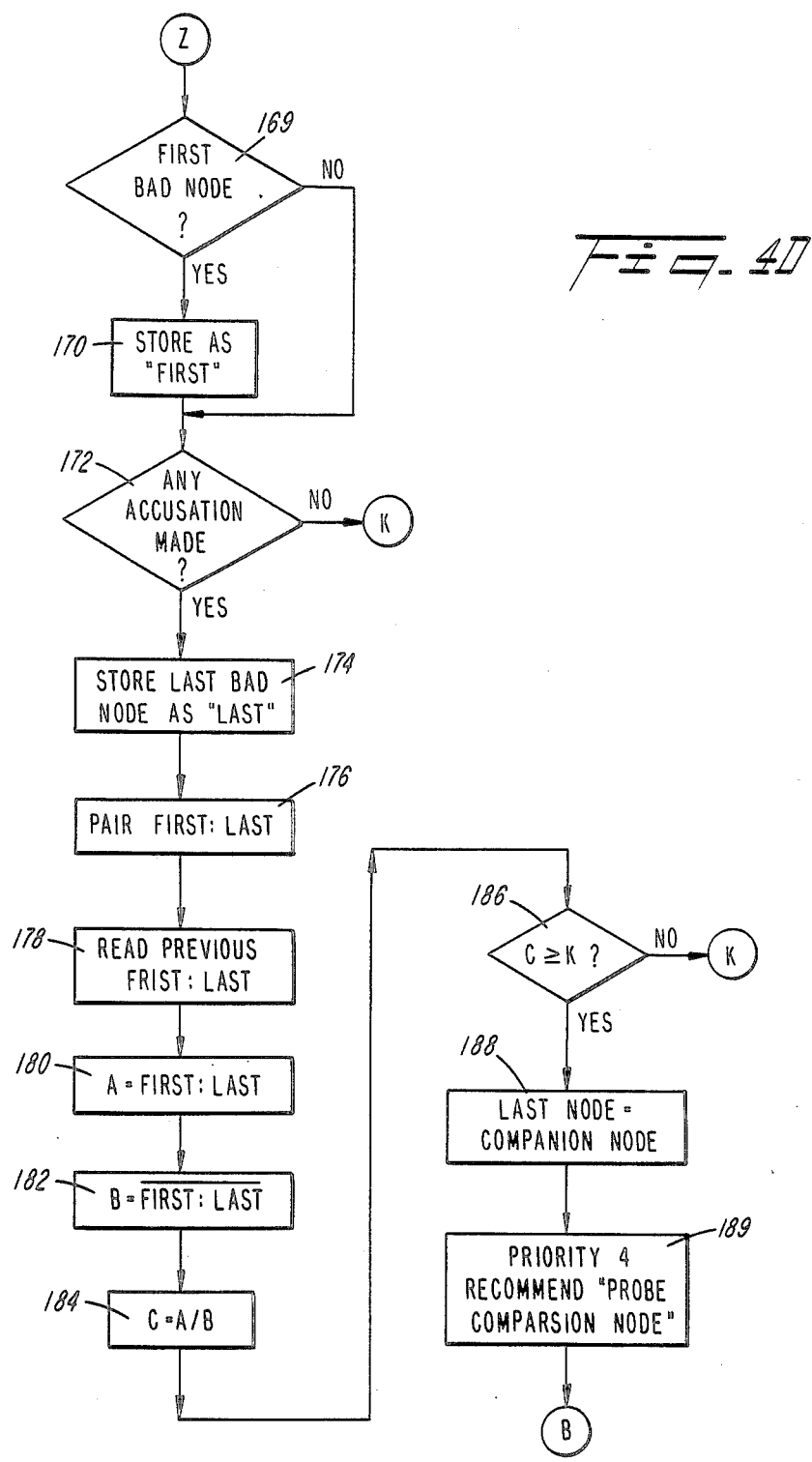

COMPUTER ASSISTED FAULT ISOLATION IN CIRCUIT BOARD TESTING

TECHNICAL FIELD

The invention relates generally to computer assisted testing of electronic circuits, and more particularly toward troubleshooting circuit boards by computer assisted guided probing of circuit nodes.

BACKGROUND ART

Digital systems typically comprise a collection of circuit boards, each implementing a few major functions. The circuit boards, together, interact to produce a behavior that is required of the composite system.

When such a system fails to function properly, testing proceeds in a series of steps designed to isolate the source of a fault. The first step often is a simple go-no go test of the system as a whole, to confirm that there actually is a system fault. Sometimes such a test reveals that the system is functioning properly, but that the failure is caused by an external factor, such as an operator error or a defective power source.

Assuming that the system itself is found to be faulty, however, the next step is to isolate the fault to a particular circuit board. Circuit board level diagnosis is achieved either by running a set of functional tests which exercise the boards individually, or by replacing the boards successively with known operational boards until the system once again functions properly. Since the number of circuit boards in most systems is small, board swapping is fast and can be performed in the field.

The system is now repaired, but one is left with at least one circuit board that does not operate. Economics dictates that the board be repaired, however, the techniques that apply to board-level fault isolation are not practical for component-level diagnosis for several reasons. First, because each circuit board tends to contain a relatively large number of components, the number of different tests corresponding to the various components that would have to be performed to isolate a fault is prohibitive. Second, there are many different components which, when faulty, produce identical symptoms at fundamental outputs of the circuit board. In addition, components on a production circuit board usually are soldered in place. Component swapping thus is impractical. A method for locating a faulty component without requiring disassembly of the circuit board is therefore required.

Thus, computer guided fault isolation, also termed computer-guided probing, has been developed. In computer guided probing, the technician is directed in the placement of a logic probe back from a failing edge connector on the circuit board until the source of the circuit board fault is located. As the technician probes each node of the circuit, the node is exercised by a stimulus pattern signal injected at any circuit node on the board under test or at the microprocessor signal lines on the board. In the latter case, the microprocessor is electrically replaced with a special interface pod which is connected to a troubleshooting device, such as a Fluke 9020A troubleshooter Responses to the stimulus pattern signals at the circuit nodes are compared with pattern signals developed by an operational unit under test (UUT), to identify the source of a fault at the node being probed or alternatively to recommend the next node to be probed.

Computer guided fault isolation techniques that have been applied to circuit board troubleshooting have drawbacks that become aggravated as complexity of the UUT increases. Node-to-node probing by the technician under the guidance of visual prompting by the computer is a very slow process, because the number of nodes involved is substantial in most microprocessor based systems. Furthermore, guided fault isolation is inefficient; the "cleverness" and "intuition" of an experienced technician are not implemented in the computer based methodology. For example, although prior art guided fault isolation systems apply a single stimulus pattern signal to the UUT, e.g., circuit board, to exercise all nodes, all nodes in practice are not reliably testable using a common stimulus pattern. The stimulus pattern should ideally be tailored to each node whose response is being probed. Furthermore, an experienced technician does not probe every node of each circuit board undergoing troubleshooting. To expedite testing, the technician, based on his experience, begins recognizing failure patterns and formulating diagnoses and upon recognizing that certain nodes in a particular UUT have failed, probes certain other "companion" nodes, to confirm his diagnosis. His probing may furthermore be limited to particular areas of the circuit board based upon the initial diagnosis that only particular functions of the circuit board have failed. Furthermore, the technician, unlike guided fault isolation systems of the prior art, is capable of testing circuit components and functions on bidirectional signal lines that commonly exist in microprocessor based UUTs.

Accordingly, one object of the invention is to provide an improved method of and system for isolating circuit faults in a UUT.

An additional object is to provide computer aided guided fault isolation on bidirectional signal lines such as those common with microprocessor based UUTs.

Another object is to provide guided fault isolation that is controlled by a user programmable computer.

A further object is to provide guided fault isolation wherein clues to the technician are developed by a computer as testing progresses, to expedite fault source location.

A further object is to provide a method of and system for guided fault isolation during circuit board troubleshooting wherein circuit nodes are stimulated by different stimulus pattern signals that are tailored for each node being probed.

A further object is to provide guided fault isolation incorporating "artificial intelligence" whereby failure modes of each type of UUT are stored over time and processed to generate prompting of the technician on the basis of established failure mode patterns.

An additional object is to provide optimized guided fault isolation wherein a variety of different types of node responses to stimulii are stored and compared to measured responses.

A further object is to provide a guided fault isolation system wherein the technician can apply intuition during testing.

DISCLOSURE OF INVENTION

The above and other objects are satisfied in accordance with the invention by a computer means, preferably a personal computer, having a data base into which is stored a circuit description of a UUT as well as a number of different stimulus tests and responses expected from each node of the circuit. A generator means controlled by the programmed computer means generates any of a number of different stimulus pattern signals for functional testing and node testing of the UUT. Responses to the stimulus pattern signals at the circuit nodes of the UUT are measured by a probe operated by a technician or by electro-mechanical means. The computer means prompts the technician to probe the UUT node-to-node or electrically directs the electro-mechanical means to probe node-to-node or component-to-component, as it controls the generator means to generate particular stimulation pattern signals tailored to each node and signal flow direction. Following the probing of each node by the technician, and processing of the response, the computer displays either a fault source accusation or a recommendation of the next node to be probed.

In accordance with another aspect of the invention, data are stored in the computer representative of "clues" to be displayed to the technician depending upon the failure mode of the UUT during initial functional testing. For example, if the UUT fails during a test of its random access memory (RAM), the clue displayed to the technician may recommend initial probing of particular component pins at the RAM portion of the circuit board.

In accordance with an additional aspect of the invention, during each test, the location of the first "bad" node encountered is stored. When a fault accusation is ultimately made, the location of the last "bad" node encountered during that test is also stored. A history of "first/last" node pairs is retained for all UUTs diagnosed. Each pair is assigned a "hit-ratio" which is equal to the number of times that the first node is paired with the same last node, divided by how many times it is not. If a pair has occurred at least a predetermined number of times and has at least a predetermined hit ratio, the last node is defined as the "companion" of the first node. Thereafter, whenever the first "bad" node encountered has a companion node, and its companion node is untested, the technician is prompted to test the companion node as a possible short-cut in the troubleshooting process.

Still other objects and advantages of the present invention will become readily apparent to those skilled in this art from the following detailed description, wherein we have shown and described only the preferred embodiment of the invention, simply by way of illustration of the best mode contemplated by us of carrying out our invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 1 is a block diagram of a hardware configuration employed for guided fault isolation;

FIG. 2 is a symbolic diagram of the data base established by programming;

FIG. 3 is a diagram showing the pluralistic relationship between stimulus tasks and nodes, in accordance with the invention; and FIGS. 4A-4D are a flow chart of programming incorporated in the invention.

BEST MODE FOR PRACTICING THE INVENTION

Figure 4A:
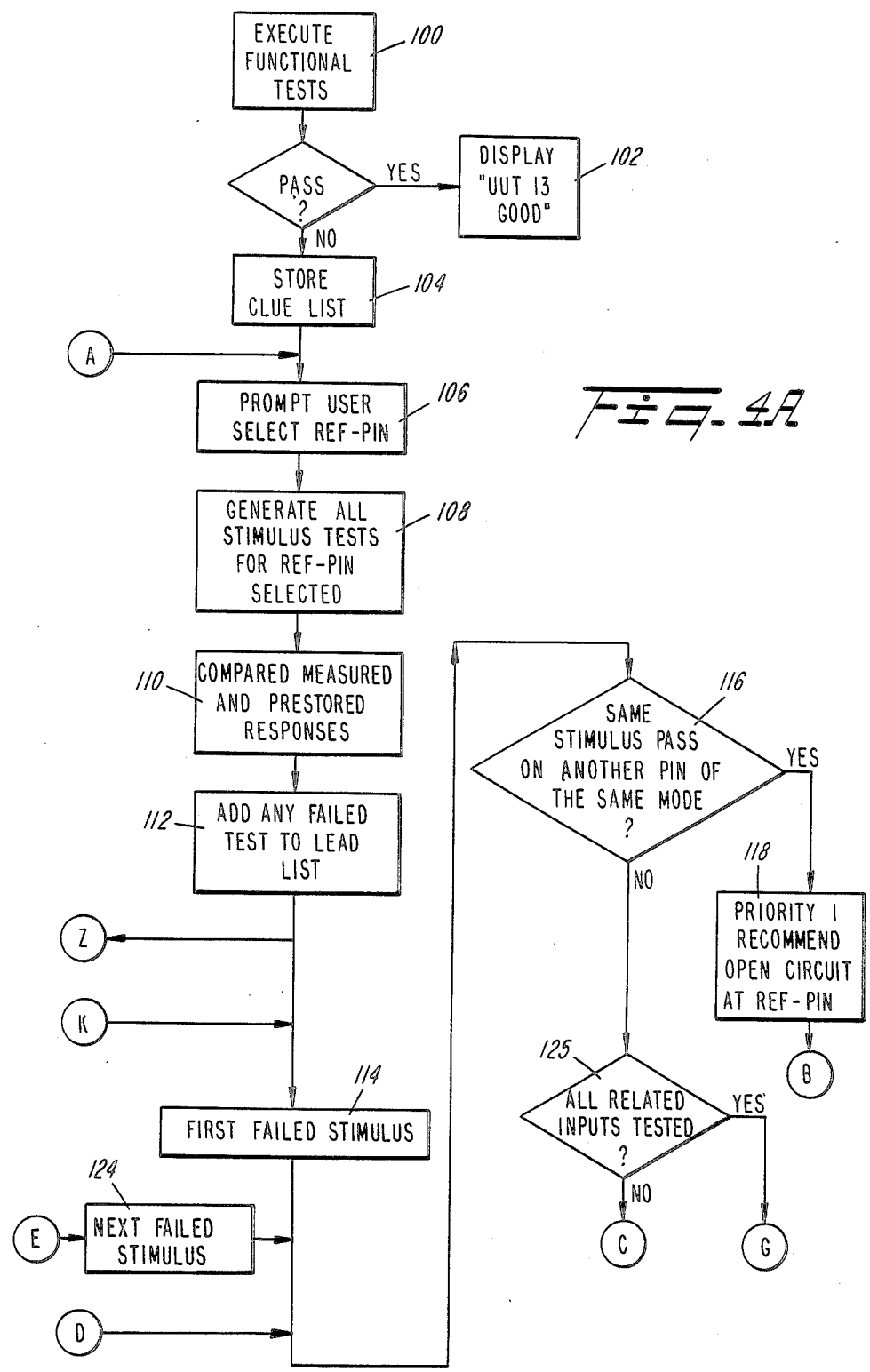
Figure 4B:
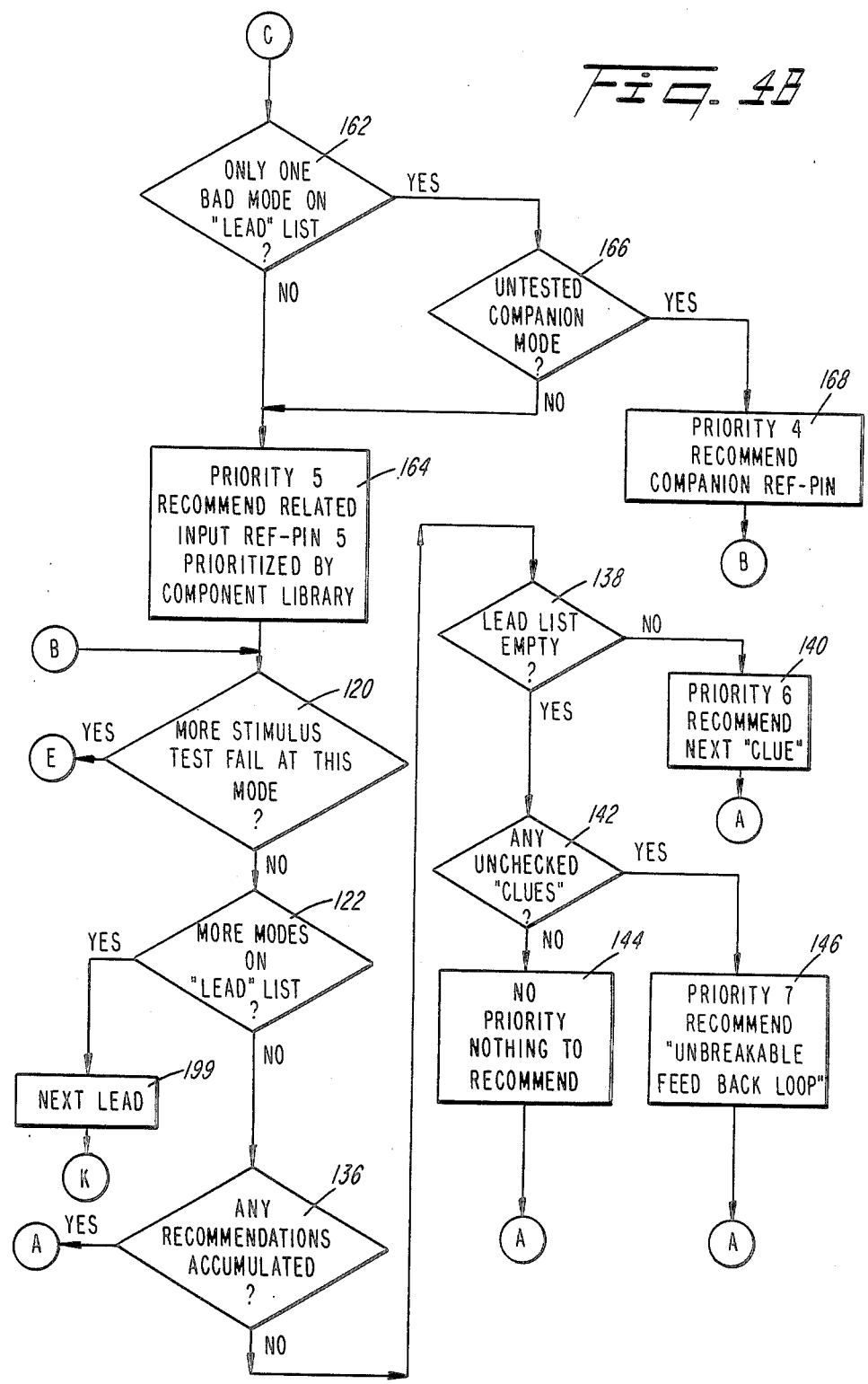
Figure 4C:
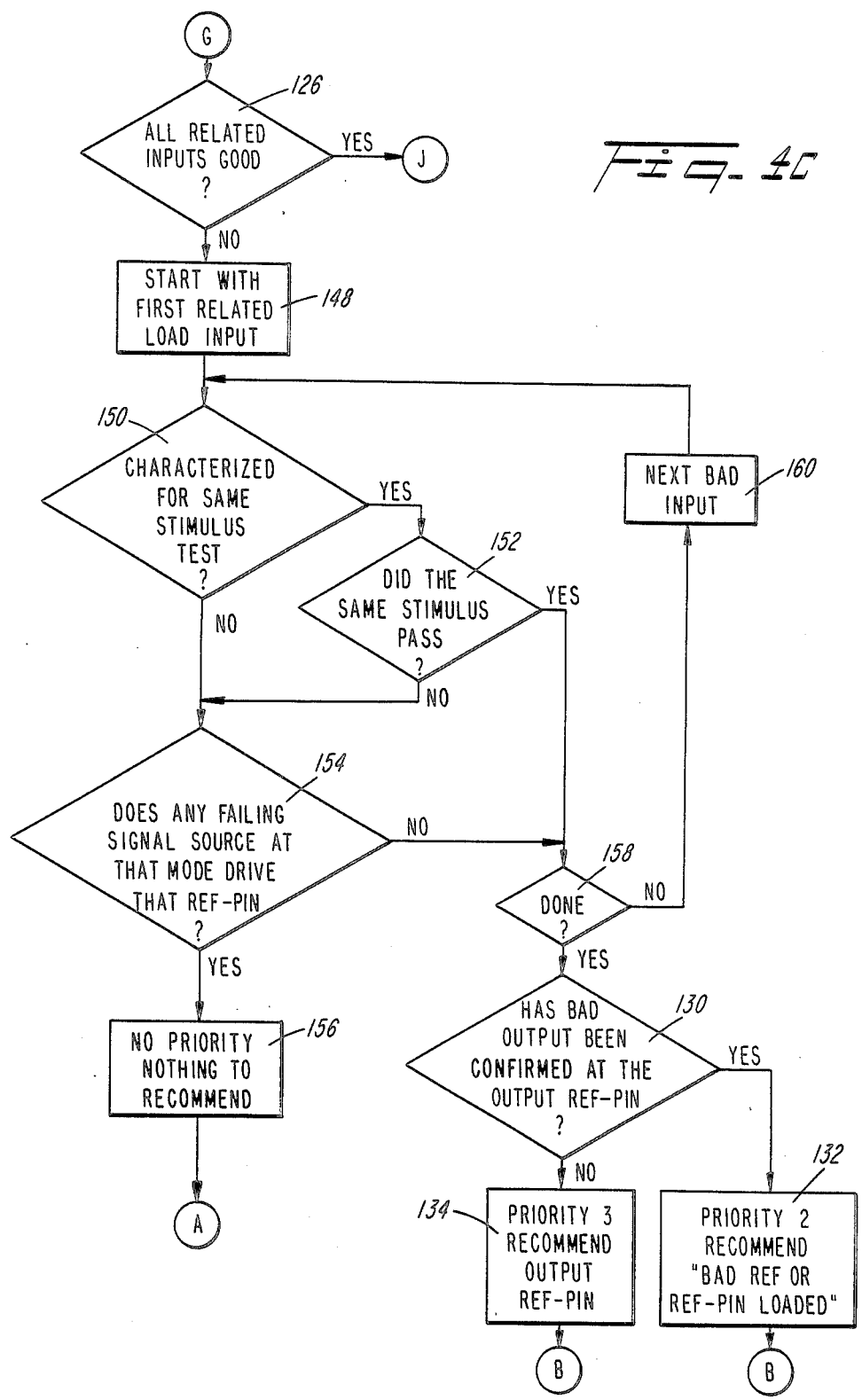

With reference to FIG. 1, a circuit troubleshooter 10 is controlled by a computer 12 over a serial interface 14 to test and locate circuit faults in a unit under test (UUT) 16, in accordance with the principles of the invention. The computer 12 preferably is a personal computer, such as an IBM PC, configured in a standard manner with a keyboard 18 for manual entry of data and a display 20, preferably a cathode ray tube (CRT) to enable a technician to view test results. Computer 12 contains sufficient memory to store programs and data base files, to be described in detail hereinafter, to command circuit tester 10 to perform functional testing of UUT 16 by supplying to the UUT appropriate stimulus tests, making response measurements and interpreting results to classify the UUT as "good", i.e., fully operational, or "bad" and identifying the source of the failure.

Circuit tester 10 is a conventional system for testing microprocessor based circuit boards. An exemplary system is a type 9020A micro-system troubleshooter manufactured by John Fluke Mfg. Co., Inc., Everett, Wash. that itself is microprocessor controlled to test the UUT 16 by simulating the UUT based microprocessor and monitoring the performance of the UUT to identify defective circuit functions. The tester 10 supplies stimulus signals to the UUT 16 through an interface pod 22 having a connector 24 that is coupled to UUT 16 by connection to the microprocessor or to the microprocessor socket, with microprocessor removed. A manual probe 26 is operated by the technician who probes the UUT node by node while the tester exercises the UUT circuitry.

Information gathering at the probe 26 is asynchronous, or synchronized with different UUT events, such as the address cycles and data cycles. Within tester 10, data measured by probe 26 is measured and recorded in three different ways. First, a logic level history records which combination of three possible logic states, low, high or invalid, was detected during a sampling. A count register records the number of falling edges monitored by the probe, and a signature register accumulates signatures based upon the sequence of clocked logic levels detected. Any or all of these three different data types may be processed for testing a particular circuit node of the UUT 16. Of course, any other means for gathering node data, such as by addressing individual pins of a circuit clip or "bed of nails", may be employed, although only manual probing is disclosed in detail herein.

The circuit tester 10 is controlled by computer 12 to perform initial functional testing of UUT 16, for identification of any inoperative circuit subsystems, and then to conduct guided fault isolation (GFI) troubleshooting at the component level to identify the sources of any circuit faults. The computer 12 is programmed to store a detailed description of all circuitry underlying the UUT 16 as well as store particular stimulus patterns to be applied to the UUT and responses expected from the circuit nodes of the UUT. The circuit topology is provided to the computer 12 by the technician who establishes a data base of component descriptors, component characteristics, interconnections and stimulus-responses. Referring to FIG. 2, the data base stored within the memory of computer 12 that is established for each type of UUT consists of a first data list, termed "TYPE", which is a library of all components used in the UUT. The TYPE list identifies the component, preferably by its commercial designator, and identifies the input and output terminals of each and the dependency relationships among them. For example, the TYPE entry associated with a conventional 7400 quad nand gate is as follows:

```
*Type 7400
    3 = O (2, 1);
    6 = O (5, 4);
    8 = O (9, 10);
   11 = O (12, 13);
    7 = G;
   14 = P;
```

The first line of the TYPE entry indicates that a component, called a "7400", is the library entry. The next six lines describe the component pins and their interrelationships. Thus, pin 3 is an output, having related input pins 2 and 1. Pin 6 is an output having input pins 5 and 4, pin 7 is a ground pin, and pin 14 is connected to the power source. The TYPE library is not limited to application with any particular UUT; it is available to all UUTs, linked to particular UUT circuitry by a REFERENCE list.

The REFERENCE list provides a name for each component in the particular UUT under consideration, and its TYPE. The REFERENCE list thus links the component TYPES, generally using commercial names, from the TYPE list with respective reference designators, usually obtained directly from the logic diagram of the UUT. An exemplary portion of a UUT reference file is as follows:

```
*REFERENCES
   u1 = 7400;
   u2 = 7410;
   u3 = 7400;
   u4 = 74125;
   k1 = RELAY;
   j1 = JACK62;
```

The first line identifies what follows as constituting the reference list. The lines that follow associate each reference designator with a component type. Thus, reference designators u1 and u3 are each type 7400 integrated circuits (quad nand gates). Reference designator u2 is a type 7410 integrated circuit, and designator u4 is a 74125 type integrated circuit. The designator k1 is a relay, and the designator j1 is a jack. Other types of components, such as connectors, switches, resistors, etc., are similarly associated with particular component types, i.e., commercial designations, in the reference list.

The NETS list in the data base shown in FIG. 2 is a description of circuit interconnections associated with a particular UUT. The NETS list consists of descriptors of each net of the circuit constituting the UUT; a net is a set of component pins that are connected together, establishing a node. Each pin is identified as a REF-PIN pair, wherein the first identifier is a component reference designator obtained from the reference list, and the PIN is the particular pin of the component identified in the TYPE list. The NET list is developed by the user making keyboard entries directly from the circuit schematic. An exemplary NET list is as follows:

| *NETS  |        |        |       |       |       |
|--------|--------|--------|-------|-------|-------|
| u11-2  | u26-9  |        |       |       |       |
| u11-3  | u82-9  | u98-12 |       |       |       |
| u11-4  | u98-6  |        |       |       |       |
| u11-11 | p1-1   |        |       |       |       |
| u2-20  | j1-b04 | j2-b04 | j3-b04| j4-b04| j5-b04|

Thus, the NET list indicates that pin 2 of component u11 is connected to pin 9 of component u26. Likewise, pin 3 of component u11, pin 9 of component u82 and pin 12 of component u98 are all connected together. Two nodes are established, one between components u11 and u26 and another between components u11, u82 and u98. Other nodes are established by the remaining lines of the NET list. It is apparent that the NET list becomes large for circuits of moderate complexity; conventional diagnostics may be provided for testing the integrity of the NETS list and identifying errors or omissions as well as generating a summary listing.

Other data constituting the data base of computer 12 includes a description of the microprocessor interface pod 22 and connector 24. During troubleshooting, the circuit tester 10 under control of the computer 12 provides, as mentioned earlier, stimulus signals to the UUT 16 via the microprocessor bus. The address and data lines of the bus as well as status, control and enable are identified in this list. The system thus is not limited to a single type of microprocessor; it can accommodate virtually any UUT microprocessor architecture.

The data base of computer 12 further contains a number of different stimulus tests and corresponding node dependent responses, as shown in FIG. 3. The stimulus tests are developed by the technician to exercise particular nodes, stored as "REF-PINS" in the data base, and responses expected to be probed by manual probe 26 if the UUT is "good" are stored in the data base. The technician who develops the stimulus tests is, of course, experienced and familiar with the circuitry underlying the UUT. Responses expected from the circuit nodes being probed are developed by direct measurement of a known good UUT tested during a "characterize nodes" procedure, to establish a reference.

To develop a stimulus program, the technician determines the particular sequence of tester 10 operations, i.e., read, write, etc., that will exercise each node of the UUT sufficiently to reveal any faults affecting that node. The technician then executes the resulting stimulus programs and measures the response of the node being exercised using a UUT that is known to be good, i.e., fully operational. The technician finally commands the system to enter the expected response into the data base.

An example of a stimulus program is as follows:

```
*PROGRAM DATAINu33
CALL, INIT
sync, d, 0
read probe
read, FE020, FE030
read probe
```

The first line of the program identifies the particular stimulus (DATAINu33) for reference elsewhere.

The sequence of stimulus commands begins on the second line of the program. The first command calls the subroutine "INIT" (another stimulus program) to place the UUT into a known starting state. The remaining lines contain commands incorporated within the 9020A tester, for this example. The "sync" command instructs the probe to sample its signal only during microprocessor data cycles. The first "read probe" command resets the probe and prepares it to gather data. The "read" command performs a sequence of read operations starting at address fe020 and ending at address fe030. Finally, the second "read probe" command retrieves the accumulated signature, level history and count information measured by the probe. This latter aspect of the invention is particularly significant; the type of response monitored at each node is thereby not limited to a signature response, as is typical in the prior art. Rather, any type of response, such as level history and count, or other type, can be monitored as a response and compared to a predetermined response stored in the data base.

Only the exercised output pins are identified in conjunction with each stimulus program. It is not necessary to identify specifically input pins connected to those outputs, because the interconnections between input and output pins are already provided in the NETS list. Thus, when an input pin is probed, each output pin that is connected to it is stimulated. Since all pins on a net are connected together, the expected response at any input pin is identical to that at the connected output.

Of particular significance, a single stimulus program can exercise many different output pins. Thus, with reference to FIG. 3, a stimulus program may drive numerous outputs, providing a convenient functional approach to writing stimulus programs. A simple stimulus program may be written by the technician to supply a variety of different patterns across the microprocessor data bus via interface pod 22 and connector 24. The technician then examines the logic diagram of the UUT with reference to the microprocessor noting which nodes may be characterized with that stimulus program.

Similarly, a single pin may be exercised by several different stimulus programs, as also shown in FIG. 3. When a pin is thus probed, each of a number of different associated stimulus programs is run individually. A pin therefore may be tested thoroughly by a combination of different stimulus routines, each of which by itself performs only a partial check of the node.

The ability of the system in accordance with the invention to supply different stimulus tests to the UUT, tailored for each node to be tested, is also of significance because it enables bidirectional testing of components to take place on the data bus. To test connections and components that communicate with each other bidirectionally on a bus, separate stimulus programs are provided to exercise each component in a transmitting mode and in a receiving mode. For example, assume that a random access memory and the microprocessor are connected together on a data bus. The microprocessor, in a write mode, sends data over the bus to the random access memory, and in a read mode, receives data from the random access memory. In accordance with the invention, separate stimulus programs are developed to test the memory in the two different modes.

The computer 12 has a data base stored therein describing the topological characteristics of the UUT as well as stimulus pattern signals and expected responses associated with each circuit node. The computer is programmed to back-trace and identify the source of a fault, once a bad node is determined to exist during functional testing. Functional testing is accomplished by a set of functional test programs, developed by the technician, which test complete subsystems of the UUT. Each functional test program tests a particular subsystem and reports that the subsystem is operational or not operational. Like stimulus programs, the functional test programs consist of sequences of tester 10 operations which exercise portions of the UUT 16 by means of the interface pod 22. The sequencing of the tester 10 operations is controlled by the computer 12. After functional testing has identified a faulty subsystem, the computer 12, in a guided fault isolation (GFI) mode, isolates the source of the fault.

Functional tests, when executed on a UUT, either pass or fail. One example of a functional test is a RAM test that exercises all cells of a random access memory to identify any faults, such as open or shorted cells, shorted address lines, cross-coupling, etc. Under program control, the tester 10 exercises all cells by executing a built-in RAM test. Other subsystems that may be tested with built-in tests during functional testing include ROM tests, bus tests and I/O tests. In accordance with one aspect of the invention, a functional test, if failed, causes generation by the computer 12 of one or more "clues" which prompt the technician to initiate guided fault isolation (GFI) testing at particular nodes. For example, during a RAM test, a prompt, to be displayed on CRT 20, may recite "functional test passed" if the random access memory tests "good". On the other hand, in response to a functional test failure, the prompt may indicate "functional test failed" with the following clues:

u11-11
u11-12
u11-13
u11-14

Pins 11, 12, 13 and 14 of the random access memory device identified as u11 are thus recommended for testing first, since the circuit failure was determined during functional testing to involve the random access memory. The particular clues to be reported to the technician in response to failure of functional testing are programmed into computer 12 by the programming technician in accordance with the characteristics of each UUT.

To diagnose a UUT, it is presumed that the data base for the particular UUT undergoing diagnosis has been constructed. Once the data based exists for a certain UUT type, the system is capable of diagnosing any number of similar UUTs. The operation of the system, programmed in computer 12, is described in the flow chart of FIGS. 4A–4D.

During testing, the UUT is provided with proper power supply connections. The microprocessor constituting a component of the UUT is typically removed from its microprocessor socket, and connector 24 of interface pod 22 is inserted into the socket in place of the microprocessor. Power is applied to the UUT, and the programm shown in FIGS. 4A–4D is executed on computer 12.

The program first reads the UUT data base into memory, and then presents to the technician various UUT configuration options for selection during initial setup. Typical options include selection of memory sizes associated with different species of related UUTs. Once all options have been configured, a list of available functional tests is displayed on display 20. The technician selects the functional test to be performed, and a message is displayed on display 20 indicating whether the UUT has passed or failed the various tests (step 100; FIG. 4A of the flow chart). If the test has passed, the display 20 indicates that the UUT is good (step 102); otherwise, the prestored clues are displayed (step 104) as a suggestion for initial testing by the technician.

Following functional testing, the system enters a guided fault isolation (GFI) mode, wherein a "lead" list corresponding to "bad" output pins is formed and analyzed. Software executed by computer 12 develops a prioritized list of recommendations based upon the analysis.

The technician is prompted at display 20 to make a first circuit measurement with manual probe 26 (step 106). The technician either accepts the suggestion generated during step 106, or ignores the suggestion, following his own intuition. He keyboard enters the identification of the node being probed, and computer 12 controls circuit tester 10 to generate all the stimulus tests associated with the particular node or REF-PIN selected (step 108). Measured and prestored responses are compared (step 110), and nodes associated with any stimulus tests that have failed are stored as the "lead" list of "bad" output pins to be used subsequently during fault isolation.

Thus, the output REF-PIN associated with any failed stimulus test is added to the lead list in step 112. Starting with the first failed stimulus (step 114) a test is made to determine whether the fault causing the "bad" node to occur is an open circuit. The software determines whether the same stimulus that has failed presently has passed on another pin of the same node (step 116). If so, an open circuit at the present REF-PIN is considered to have occured. An open circuit is presumed since in the absence of an open circuit at any pin of the node, a stimulus response on all pins will fail if one stimulus response fails. The open circuit accusation, which has a highest level of priority, is displayed on CRT 20 (step 118).

The program now continues to step 120 (FIG. 4B) to determine whether additional stimulus tests have failed at the same node. If so, the program advances to the next failing stimulus test (step 124) and returns to step 116 to make another open circuit test. If not, the program determines, at step 122, whether any other output pins are on the "lead" list; in other words, whether any other outputs have failed. If so, the program advances to the next "lead" at step 199 and repeats steps 114, etc., to determine the source of the failure.

Assuming that there is no open circuit identified in step 116 during this portion of the test, the program determines whether all related inputs have been tested (step 125). The related inputs are identified from the TYPE list of the data base.

If all related inputs have been tested, the program determines whether all related inputs are "good" (step 126). If all related inputs are "good" the program continues to step 128 where confirmation of a bad output at the output REF-PIN is made (step 130). If the bad output at the output REF-PIN is confirmed, indicating that the output is "bad" but that associated inputs are "good", either the reference component is "bad" or the output pin is loaded. This accusation, having second priority, is displayed by CRT 20 (step 132).

If on the other hand the bad output node has not been confirmed, the technician is prompted to probe the output REF-PIN (step 134). In either case, the program returns to step 120 to determine whether any additional stimulus tests applied to the same node have failed. This is important, because unlike GFI testers of the prior art, the system herein is capable of multiple testing of nodes using different stimulus pattern signals and evaluating the responses at each node from the stimulus pattern signals individully. Each stimulus pattern signal typically is a combination of READ, WRITE and TOGGLE commands, and separate stimulus patterns can be provided on bidirectional buses for each device, depending upon data direction. The number of different stimulus pattern signals should, therefore, equal or exceed the number of devices that can place valid data on the bus.

If there are more stimulus tests that have failed at the node, the program advances to the next failing stimulus test, and returns to step 116; otherwise, the program continues to step 122 to identify any additional nodes on the "lead" list. Assuming that no additional nodes are on the "lead" list, the program continues to step 136 to determine whether any recommendations for further probing have been accumulated. If so, the program returns to step 106 to enable the technician to select the next node for probing. But if no recommendations for probing have been accumulated, yet the "lead" list does identify some bad output pins, (step 138), the CRT 20 is controlled to display a prompt identifying an "unbreakable feedback loop" (step 140). At this point in the program, a feedback loop is known to exist, because that is the only circumstance in which it is possible to have entries in the "lead" list without accumulating any recommendations. The program now returns to step 106 to enable the technician to select the next node, based upon the recommendation or on his own intuition, for probing.

If, on the other hand, the "lead" list is empty, the program continues to step 142 to determine whether any clues remain unchecked. If all clues have been checked, the program returns to step 106 for further probing by the technician. Because the program in responce to step 142 has not formulated any accusations or suggestions for further probing, the technician is left to his intuition (step 144). If, on the other hand, there are unchecked clues, the CRT 20 is controlled to recommend the next clue to the technician (step 146) and to prompt him to probe the next pin (step 106) either by accepting the clue or deferring to his own intuition.

If, in step 126, some related inputs are determined to be "bad", having identified the related inputs from the TYPE list, the first related bad input (step 148) is tested to determine whether it has been characterized for the same stimulus program that revealed the bad output pin (step 150). This is done because the program cannot prove a cause-effect relationship between a bad input pin and its related output pin unless the two pins have been tested using a common stimulus program. If the stimulus is the same, the program determines whether that stimulus test has passed on the related input (step 152). If the stimulus test has not passed, or alternatively, if the input of the device is not characterized for that stimulus test, the program continues to step 154 to determine whether any failing signal source at the node under test logically drives the input of the device at the REF-PIN being probed. If so, the result is inconclusive (step 156) and the program returns to step 106 to prompt the technician to probe another REF-PIN.

If on the other hand there is no failing signal source at the node tested in step 154, step 158 of the program determines whether there are any other bad inputs to be tested to identify whether other potential signal sources for the node under test should be ignored. The next bad input (step 160) is thus tested at steps 150, 152 and 154. If on the other hand there are no additional bad inputs, the program continues from step 158 to step 130 to either recommend that the output REF-PIN be probed if it has not already been probed (steps 130 and 134) or to identify the component to be bad or identify its output as loaded (steps 130 and 132). In either case, the program returns to step 120 to perform, if necessary, more stimulus tests at the node.

Returning to step 125, if some related inputs at a node, identified by the TYPE list, have not been tested, the program employs "artificial intelligence" or a form of "intuition" to identify failure trends in particular UUTs. This is done by storing the first "bad" node encountered during troubleshooting of each UUT, and when an accusation is made, storing the last bad node encountered during testing. The number of times that the first node is paired with the last node, upon accusation, is compared with the number of times it is not, to define a "hit-ratio". If the hit ratio is above a predetermined amount, the failure trend is deemed established. The last node is defined as a "companion" of the first node, and is recommended for probing whenever the first node appears as the only node on the "lead" list. This expedites fault location.

Thus, in step 162, the program determines whether there is only one bad node on the "lead" list. If not, CRT 20 prompts the technician to probe related input REF-PINs prioritized by their order of entry into the TYPE list of the data base (step 164). If on the other hand there is only one bad node on the "lead" list, the program determines whether there is an untested companion node that has been established during prior testing (step 166). If so, CRT 20 is prompted, in step 168, to recommend probing of the companion.

The companion pin is determined by the program at step 169. Following step 112, which adds leads to the lead list in response to determination of a failed node, the program determines whether the failed node is the first bad node. If so, the node is characterized as the "first" bad node (step 170). If no accusation is now made, the program continues to step 114 for stimulus testing. If an accusation has been made, however (step 172), the last bad node tested prior to the accusation is stored as the "last" bad node (step 174). Corresponding first: last bad node pairs are now stored in memory (step 176). The number of previous first bad nodes and last bad nodes stored in memory are read in step 178. Step 180 counts the number of times that the first and last nodes were paired during an accusation, and step 182 measures the number of times they were not paired. The "hit ratio" is computed in step 184, and the last node is identified as a companion node in step 186 and step 188 if the hit-ratio is greater than a predetermined ratio. If so, CRT 20 prompts the technician to probe the companion node, and thereby expedite location of the fault that historically tends to be identified by these first and last nodes.

During testing, a history of each node probed as well as the good/bad status of each is stored in memory. A report summarizing each test is thus available to the technician by accessing the memory.

There has been described a novel guided fault isolation system that expedites fault location by generating clues in response to preliminary functional testing and simulates a technician's "intuition" by associating failed nodes with recurring fault modes. The system far surpasses prior art circuit testers in versatility because unlike the prior art, different stimulus test patterns applied to the UUT microprocessor buses are tailored to individual nodes being probed and, where bidirectional buses are involved, tailored to signal direction. The responses stored and compared with measured responses at each node are not limited to any particular type, such as CRC signatures as in conventional, but rather includes other types of responses such as, but not limited to, any combination of synchronous level history, asynchronous level history, range of transition count and range of frequency, as well as CRC signature. Furthermore, although display data is generated by computer 12 to guide manual probing of a UUT, the data may alternatively be applied to control a servo operated probe or bed of nails or the like, to automatically measure circuit nodes and, ultimately, identify circuit faults.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

We claim:

1. A system for isolating circuit faults in a unit under test (UUT) including a circuit board to which are connected electronic components interconnected at circuit nodes on a bidirectional bus, the system comprising:

generator means for generating first stimulus pattern signals for exercising nodes of said UUT in one direction of said bidirectional bus and for generating second stimulus pattern signals for exercising nodes of said UUT in an opposite direction of said bidirectional bus;

interface means for applying the stimulus pattern signals to the UUT;

measurement means responsive to the direction of said bidirectional bus through which nodes are exercised for measuring responses of the UUT to the first or second stimulus pattern signals at the circuit nodes;

programmed computer means having memory means storing circuit topology data of the UUT, predetermined stimulus pattern signals associated with various circuit nodes of the UUT and responses expected from those nodes;

said computer means including means for controlling said generator means to generate selectively said first and second stimulus pattern signals depending upon the particular circuit node responses being measured by said measurement means, comparing measured and predetermined responses and, in response, isolating circuit faults;

data entry means for entering into said computer means data identifying circuit nodes being measured by said measurement means; and means responsive to said computer means for guiding said measurement means to appropriate nodes to be measured and for making circuit fault accusations.

2. The system of claim 1, wherein said measurement means comprises a manual probe and said guiding means includes display means for displaying user prompts generated by said computer means to guide the user to probe appropriate nodes and for displaying circuit fault accusations.

3. The system of claim 2, wherein said display means comprises a cathode ray tube (CRT).

4. The system of claim 1, including a serial interface between said computer means and said generator means.

5. The system of claim 1, wherein said memory means includes means storing data describing characteristics of said components and the connections between said components.

6. The system of claim 5, wherein said memory means further includes means storing a history of nodes measured and a good/bad status of each node measured.

7. The system of claim 5, wherein said memory means further includes means storing data representative of circuit fault clues associated with functional testing of said UUT, said display means being responsive to said computer means for displaying said clues.

8. The system of claim 5, wherein said memory means further includes means storing identification of first and last circuit node failure associated with fault accusations encountered during previous testing; and means for controlling said display means to identify the last node when the first node is the only node determined to be "bad".

9. A system for isolating circuit faults in a unit under test (UUT) including a circuit board to which are connected electronic components interconnected at circuit nodes, the system comprising:
   generator means for generating stimulus pattern signals for functional testing of said UUT;
   interface means for applying the pattern stimulus signals to the UUT;
   measurement probe means for measuring responses of the UUT to the stimulus signals at the circuit nodes;
   programmed computer means having memory means storing circuit topology data of the UUT and responses expected from the circuit nodes, said computer means including means for controlling said generator means and, in response to measured and expected responses, identifying circuit faults;
   said computer means including further memory means storing accumulations of first and last circuit node failures associated with particular fault accusations encountered during previous testing and means for identifying said last node when the first node is tested "bad"; and
   display means for displaying the identity of the last node as a node to be probed.

10. In a system for testing a circuit board containing electronic components interconnected at circuit nodes, supplying signals to the nodes for exercising said nodes through bidirectional signal lines on the board; a guided fault isolation method, comprising the steps of:
   (a) functionally testing a circuit board to identify the existence of a fault within a functional portion of the circuit board;
   (b) applying to the bidirectional signal lines different diverse stimulus pattern signals depending upon the particular nodes being monitored and upon the direction through which said nodes are exercised in said bidirectional signal lines;
   (c) measuring responses at the circuit nodes with a measurement probe;
   (d) comparing measured responses with predetermined responses corresponding to said nodes and said diverse stimulus pattern signals; and, in response,
   (e) generating signals identifying subsequent nodes to be measured by said measurement probe;
   (f) identifying a source of the circuit fault; and
   (g) generating signals representing fault source accusations.

11. The method of claim 10, including storing pairs of first and last nodes tested and associated failure accusations encountered during previous testing; and displaying and prompting an identification of the last node when the first node is determined to be "bad".

12. The method of claim 10, including storing a clue associated with a particular functional failure type determined during step (a) and displaying said clue to identify a priority of node responses to be measured to identify a first bad node.

13. The method of claim 10, including the step of storing a good/bad status of each node probed.

14. In a system for testing a circuit board containing electronic components interconnected at circuit nodes, a guided fault isolation method, comprising the steps of:
   (a) functionally testing a circuit board to identify the existence of a functional fault;
   (b) applying to the signal lines different stimulus pattern signals depending upon the particular nodes being monitored;
   (c) measuring responses at the circuit nodes with a measurement probe;
   (d) comparing measured response with predetermined responses corresponding to said nodes; and, in response,
   (e) generating signals identifying subsequent nodes to be measured by said measurment probe;
   (f) identifying a source of the circuit fault;
   (g) generating signals representing fault source accusations;
   (h) identifying a first bad node;
   (i) identifying a last bad node prior to generation of a fault source accusation;
   (j) storing a cumulative first:last bad node pair list for each UUT;
   (k) establishing a "hit ratio" representing an observed likelihood of the first node being paired with the last node;
   (l) classifying said last node as a "companion" of the first node if the "hit ratio" is greater than a predetermined ratio; and
   (m) generating a signal recommending probing of the companion node.

15. The method of claim 14, wherein step (k) includes determining the number of times that the first node is paired with the last node divided by the number of times that the first node is not paired with the last node.

* * * * *